UNITED STATES PATENT OFFICE.

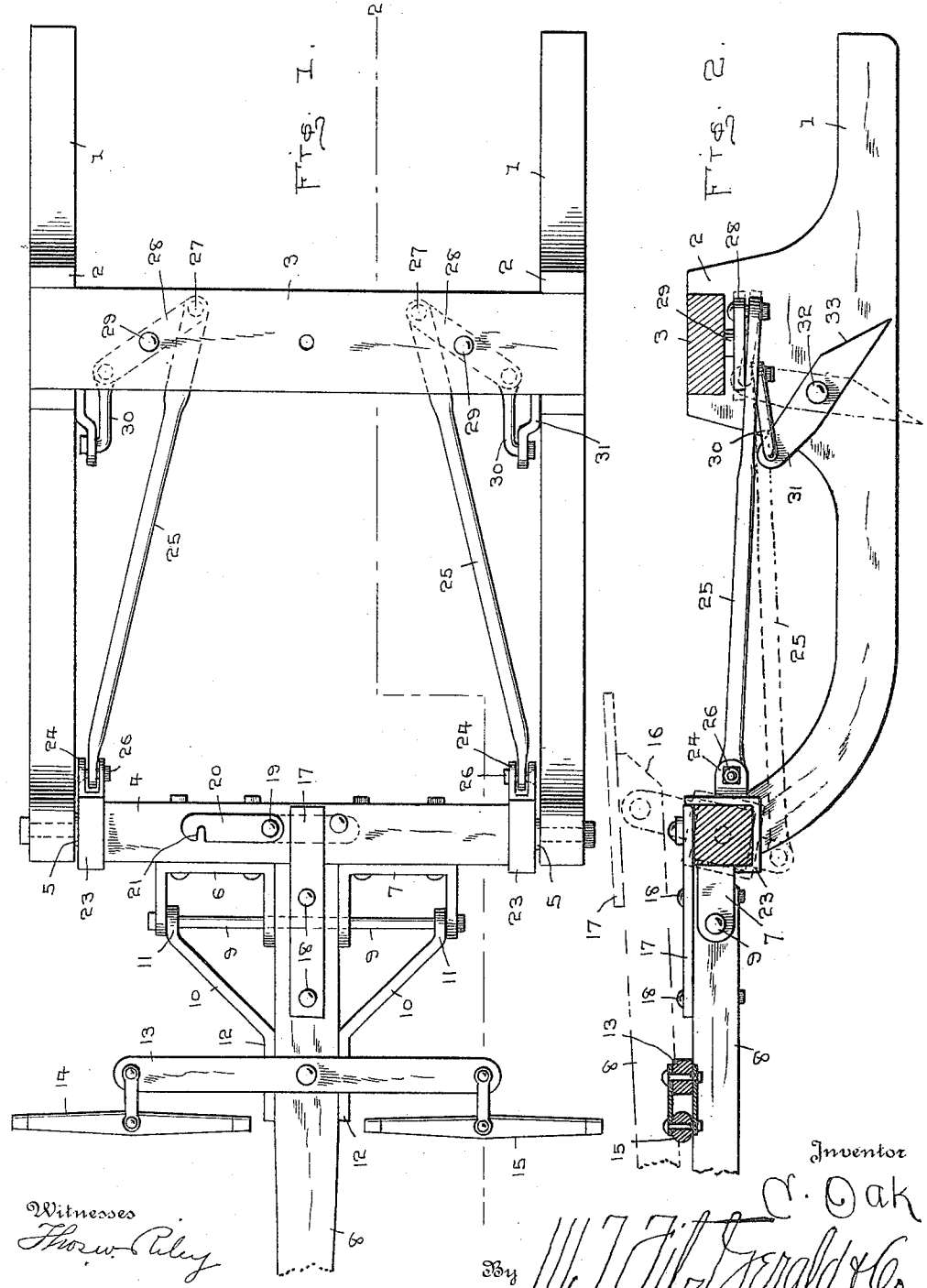

CHARLEY OAK, OF SIDNAW, MICHIGAN.

BRAKE FOR SLEDS.

1,137,163.  Specification of Letters Patent.  Patented Apr. 27, 1915.

Application filed May 2, 1914. Serial No. 835,810.

*To all whom it may concern:*

Be it known that I, CHARLEY OAK, a citizen of Sweden, residing at Sidnaw, in the county of Houghton and State of Michigan, have invented certain new and useful Improvements in Brakes for Sleds; and I do hereby declare the following to be a full, clear, and exact description of the invention, such as will enable others skilled in the art to which it appertains to make and use the same.

This invention relates broadly to sleds and has particular reference to that type of horse drawn sled upon which it is desirable and necessary that a brake be used.

As a particular object, accordingly, this invention contemplates the provision of a brake whose structure shall be such as to make it adapted for use in places where the ground is rough and hilly.

An object of equal importance with the foregoing is to provide a brake of the type described which is constructed with such regard to proportion, number and arrangement of parts as to be cheaply manufactured, will be durable and efficient in operation and may be readily applied to any standard type of sled with a minimum expenditure of time and labor and without requiring any alteration in the construction of the latter.

The above and additional objects are accomplished by such means as are illustrated in the accompanying drawings, described in the following specification and then more particularly pointed out in the claims which are appended hereto and form a part of this application.

With reference to the drawings, wherein I have illustrated the preferred embodiment of my invention as it is reduced to practice and throughout the several views of which similar characters of reference designate similar parts, Figure 1 is a top plan view of the forward truck of a logging sled with my brake attached thereto, and Fig. 2 is a longitudinal sectional view taken on the line 2—2 of Fig. 1.

Before taking up the description of the drawings, I desire to emphasize the fact that while my invention has been designed with particular reference to the needs of logging sleds; has been illustrated and will be hereinafter described in that connection, it may, nevertheless, be applied with equal efficiency to other form of sled or vehicle adapted to ride on runners.

Proceeding now to the description of the drawings, it will be seen that the runners 1 of my sled are each formed with enlarged portions 2 intermediate their ends, said enlarged portions being connected by the knee 3. At the front and upturned portions of my sled the runners 1 are connected by a suitable cross beam 4, said cross beam being rotatably mounted as at 5 between said upturned portions. Upon the outer face of this cross beam 4 I preferably provide the substantially U-shaped brackets 6 and 7 which are spaced sufficiently from the transverse middle line of the cross beam to allow for the insertion of the tongue 8. A pivot rod 9 passes through the outstanding ears of both brackets and also of the tongue as is clearly shown in Fig. 1. As a further means of tongue support I have positioned the braces 10 in such manner that they extend angularly toward the tongue and have their rear ends 11 formed with apertures through which the pivot rod 9 also passes. The opposite extremity of these braces are angularly bent so as to be parallel with the tongue 8 and in contiguous relation thereby, as shown at 12. Mounted upon the tongue 8 I also provide the customary whiffle tree 13 to which are attached in the usual manner the swingle trees 14 and 15. The rearward portion of my tongue 8 is beveled at its lower extremity as shown at 16 and carries on its upper surface the plate 17 which is secured thereto by suitable fastening means 18. This plate 17 projects beyond the rear extremity of the tongue and is adapted to lie along the upper surface of my cross beam. Pivotally secured at 19 to the beam 4 in proximity to the extension of the plate 17 I provide the swinging latch 20 which is notched as at 21 on its free end, said notch 21 being adapted to engage with a supplementary pin 22 which is situated upon the opposite side of the brace 17.

At the extremities of the beam 4 I provide the brackets 23, said brackets being spaced from the upturned ends of the runners 1 sufficiently to allow a free rotational movement. The rearward ends of these brackets are formed with the ears 24 and are adapted to seat the flattened end of the connecting rod 25 therein and to pivotally mount therein as at 26. These connecting rods 25 in the preferred embodiment of my invention are formed of lengths of gas pipe in order to provide a cheap and durable structure, but it is obvious that I may use any form of connecting rod whatever with this invention. The rearward ends of these links 25 are pivotally connected as at 27 to the lever 28 which is rotatably mounted as at 29 upon the cross knee 3 which connects the runners. The opposite extremity of these levers 28 are pivotally connected to the links 30 and are in turn rotatably mounted at the extremity of the levers 31. These levers 31 are pivoted at 32 to the enlarged portion 2 of each runner and have their free ends beveled at 33 in order to produce a sharp and efficient contact with the ground.

It will be obvious that in the operation of my invention that when the sled is traveling down the hill, the backward lean of the horses or other animals will produce a backward push of the tongue 8 which rotating on its pivot 9 will in turn backwardly rotate the cross beam 4. This backward rotation of the cross beam 4 will consequently produce a forward pull on the connecting rod 25 which will result as is obvious after a perusal of the drawings in the engagement of the brake levers 31 with the ground. It will be seen that the amount of engagement with these brake levers with the ground will be in a direct proportion to the backward thrust upon the tongue 8. Accordingly it is obvious that the steeper the declivity, the greater will be the force with which the tongue 8 is backwardly projected and accordingly the deeper engagement of the brake levers 31 with the ground will result, thus gaining a highly desirable end. When however, it is desired to back the sled on a level surface and accordingly it is not wished to use the brake mechanism, all that is needed to render this mechanism inoperative is to operate the latch 20 pivoted upon the cross beam 4 so that it will lie across the extension brace 17 of the tongue so that the notch 21 engages the pin 22. When this is done it will be seen that any backward thrust of the tongue 9 will result simply in the transmission of that thrust to the cross beam 4 without any rotation of the latter so that the sled will be on a backward movement without the brakes being applied.

While in the foregoing I have illustrated in the drawings and described in the specification, such combination and arrangement of elements as constitute the preferred embodiment of my invention, I desire to emphasize the fact that I may make such minor changes in the matters of proportion and degree, in later adaptations of my device as shall not alter the spirit of my invention as defined in the appended claims.

What I claim is:

1. In a braking mechanism for sleds, a sled including a pair of runners connected with a knee and with a rotatable cross beam, a tongue pivotally mounted forward of said cross beam, an extension brace secured to the rear end of said tongue and adapted to overlie said cross beam, brackets mounted at either end of said cross beam, brake levers mounted upon the runners of the sled, and means for operatively connecting said cross beam brackets with said brake levers.

2. In a braking mechanism for sleds, a sled including a pair of runners connected by a transverse knee and by a rotatable cross beam, a tongue pivotally mounted forward of the cross beam, an extension brace secured to the rear end of said tongue and adapted to overlie said cross beam, brackets mounted upon the extremities of said cross beam, brake levers pivoted to the sled runners, means for operatively connecting the cross beam brakes with said brake levers in such manner that a backward thrust of the tongue will result in application of the brake levers and means contained upon said cross beam for use in connection with said extension brace to permit a backward thrust of the tongue thereupon without application of the brake levers.

3. In a braking mechanism for sleds, a sled including a pair of runners connected by a transverse knee and by a rotatable cross beam, a tongue pivotally mounted forward of said cross beam, an extension brace secured to said tongue and adapted to overlie said cross beam, brake levers pivoted to said sled runners, means for insuring the operation of said brake lever upon a backward thrust of said tongue, and a latch lever pivoted to said cross beam and capable of holding said extension brace upon said cross beam to permit the backing of the sled without application of said brake levers.

In testimony whereof I have signed my name to this specification in the presence of two subscribing witnesses.

CHARLEY OAK.

Witnesses:
JOHN K. GRONHOLT,
C. J. FERGUSON.

Copies of this patent may be obtained for five cents each, by addressing the "Commissioner of Patents, Washington, D. C."